United States Patent [19]
Beck

[11] Patent Number: 6,032,933
[45] Date of Patent: Mar. 7, 2000

[54] SELF-PUMPING HYDROPNEUMATIC SPRING STRUT WITH INTERNAL LEVEL REGULATION

[75] Inventor: Hubert Beck, Eitorf, Germany

[73] Assignee: Mannesmann Sachs AG, Eitorf, Germany

[21] Appl. No.: 09/017,907

[22] Filed: Feb. 3, 1998

[30] Foreign Application Priority Data

Feb. 5, 1996 [DE] Germany .................... 197 04 189

[51] Int. Cl.⁷ .................................. B60G 17/00
[52] U.S. Cl. ................................ 267/64.17; 267/DIG. 2; 188/289; 188/314
[58] Field of Search ............... 267/64.16, 64.17, 267/226, DIG. 1, DIG. 2; 188/315, 289, 322.16, 322.17, 314, 352, 318

[56] References Cited

U.S. PATENT DOCUMENTS

| 4,577,840 | 3/1986 | Meller et al. ............. 267/64.17 |
| 5,826,863 | 10/1998 | Beck ........................ 267/64.17 |
| 5,857,665 | 1/1999 | Beck ........................ 267/64.17 |

FOREIGN PATENT DOCUMENTS 44 16 641  11/1995  Germany .

*Primary Examiner*—Matthew C. Graham
*Assistant Examiner*—Robert A. Siconolfi
*Attorney, Agent, or Firm*—Cohen, Pontani, Lieberman & Pavane

[57] ABSTRACT

A self-pumping hydropneumatic spring strut that continuously regulates the pressure in the low- and high-pressure work cavities of the work cylinder to control the height of the vehicle body during all vehicle operation situations. According to the present invention, a valve is provided between the high-pressure work cavity and the pump cylinder. The valve is movable axially within the pump cylinder and advantageously blocks a first nonreturn valve between the pump cylinder and the low-pressure work cavity when spring strut is caused to elongate, and unblocks this first nonreturn valve when the spring strut is caused to compress.

9 Claims, 6 Drawing Sheets

SELF-PUMPING HYDROPNEUMATIC SPRING STRUT WITH INTERNAL LEVEL REGULATION

FIELD OF THE INVENTION

The present invention relates to a self-pumping hydropneumatic spring strut with internal level regulation.

BACKGROUND OF THE INVENTION

German Patent No. DE-OS 44 16 641 discloses a vehicle spring strut having a work cylinder that is divided by a damping piston into a high-pressure work cavity and a low-pressure work cavity—both of which act upon the work cylinder. An oil pump formed by a pump rod and a hollow space defined in a piston rod is fastened to the base of the work cylinder. The movements of the vehicle axle and of the piston rod fastened thereto that are brought about by unevenness in the road surface, for example, actuate this oil pump which constantly delivers oil, controlled by valves, from the low-pressure work cavity into the high-pressure work cavity. The piston is accordingly caused to move out of the work cylinder (i.e., during a pulling stage) until the conical tip of the pump rod produces a fluid connection between the high-pressure cavity and the pump cylinder.

The pressure compensation between the high-pressure cavity and the low-pressure cavity is effected via an outlet opening over which the piston passes as the piston is pushed out of the work cylinder.

Initially, i.e. when the vehicle is stationary and the spring strut is not actuated, the pressure between the high-pressure work cavity and the low-pressure work cavity is equalized. Since the damping valves for the pushing (i.e. when the piston is caused to move into the work cylinder) and pulling stages likewise affect the pressure regulation between the high- and low-pressure work cavities, a sharp drop in pressure disadvantageously occurs in the high-pressure work cavity relative to the low-pressure work cavity during the downward movement of the work piston in the case of a high adjustment of the damping valve. When, in addition, the work piston moves over the regulating area defined by the conical tip of the pump rod, the damping medium can flow freely out of a low-pressure oil reservoir into the low-pressure work cavity and from there into the high-pressure work cavity. This causes an undesirable temporary height gain in the vehicle body. A clear disadvantage with respect to pressure regulation consists in that the excessively rapid drop in oil volume in the high-pressure work cavity can only be regulated gradually, that is, gradually returned to the low-pressure oil reservoir.

SUMMARY OF THE INVENTION

The present invention advantageously overcomes the above-mentioned shortcomings of the prior art in a novel an unobvious manner by providing a self-pumping hydropneumatic spring strut that continuously regulates the pressure in the low- and high-pressure work cavities of the work cylinder to control the height of the vehicle body during all vehicle operation situations. According to the present invention, a valve is provided between the high-pressure work cavity and the pump cylinder. The valve is movable axially within the pump cylinder and advantageously blocks a first nonreturn valve between the pump cylinder and the low-pressure work cavity when spring strut is caused to elongate, and unblocks this first nonreturn valve when the spring strut is caused to compress.

The valve of the inventive spring strut is provided in the pump cylinder and is preferably constructed as an annular disk. The valve is arranged for axial movement on a cylindrical pin part of a pump rod that is provided with the work cylinder and that penetrates the pump cylinder as the piston rod moves in and out of the work cylinder. A first nonreturn valve provided in the work piston is configured to permit the one-way flow of liquid from the low-pressure work cavity into the pump cylinder. A second nonreturn valve provided in the piston is configured to permit the one-way flow of liquid out of the pump cylinder into the high-pressure work cavity. The valve is sized and shaped to block the flow of liquid through first nonreturn valve when the piston rod is caused to move out of the work cylinder. Conversely, when the piston rod is caused to move into the work cylinder, the valve does not block the first nonreturn valve thereby permitting the flow of fluid therethrough. The blocking and unblocking of the first nonreturn valve effects a pressure balance between the high- and low-pressure work cavities to control the height of the vehicle body during all vehicle operation situations.

The tip of the pump rod is generally conically shaped and defines a regulating area over its length. As the work piston moves axially over the conical tip of the pump rod, a fluid channel is created between the high-pressure work cavity and the pump cylinder. The channel size increases as the spring strut elongates (i.e. as the piston rod moves out of the work cylinder) and decreases as the spring strut compresses (i.e. as the piston rod moves into the work cylinder). When the piston is caused to move into the work cylinder and out of the regulating area, the channel is fluidly sealed between the piston and the pump rod.

A coil spring arranged coaxial with the cylindrical pin part biases the valve into contacting engagement with the work piston. When the piston rod is caused to move out of the work cylinder the valve moves axially along the pin part together with the work piston and piston rod, compressing the spring in the process, and the valve remains in position to block the first nonreturn valve. When the piston rod is caused to move into the work cylinder, a shoulder defined between the conical tip of the pump rod and the pin part arrests the axial movement of the valve, which is held in place by the spring. Consequently, the valve does not block the first nonreturn valve. At the approximate point where further axial movement of the valve is arrested, the piston is moving out of the regulating area and the channel between the high-pressure work cavity and pump cylinder is cut-off.

In accordance with the present invention, the valve advantageously blocks the first nonreturn valve when the spring strut is operating with the work piston in the regulating area and when the piston rod is caused to move out of the work cylinder. Only when the piston rod and work piston are caused to move into the work cylinder beyond the regulating area is the first nonreturn valve unblocked and damping medium can flow from a low-pressure reservoir into the low-pressure cavity and then into the pump cylinder.

The valve may alternatively be constructed as a cup-shaped structural component part.

In an alternative embodiment, the high- and low-pressure reservoirs may define separate cavities peripherally disposed about the work cylinder.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

The present invention provides a novel vehicle spring strut or shock absorber that continuously regulates the pressure between two cavities defined with a work cylinder to maintain the position of the vehicle at a constant height while the vehicle encounters a variety of road and travel conditions. The terms spring strut and shock absorber are used interchangeably herein and are intended to denote a load-levelling part of a vehicle suspension system.

Figure 1:
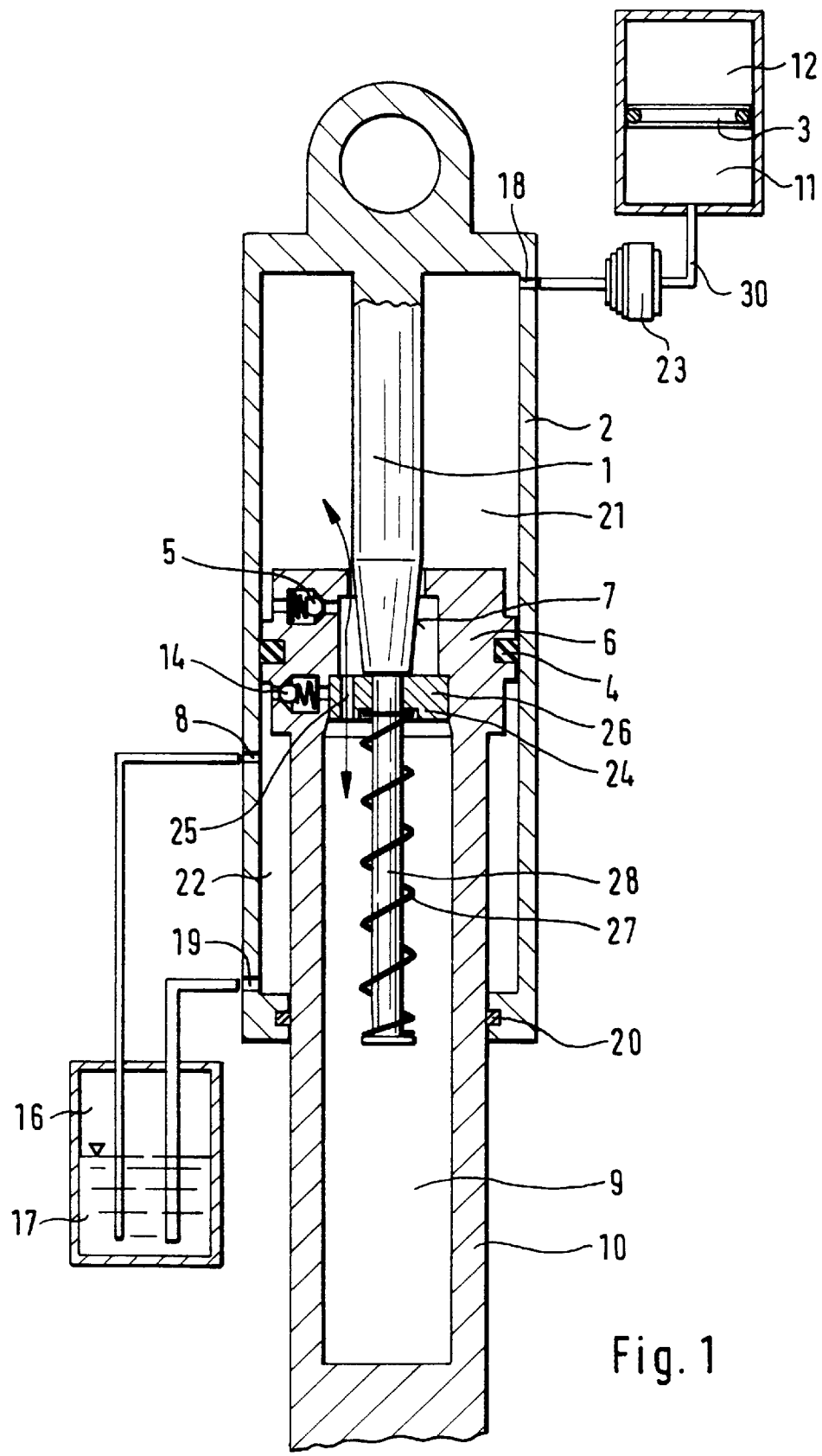
FIG. 1 is a cross-sectional view of a first embodiment of a spring strut configured in accordance with the present invention.

Referring next to the drawings, FIGS. 1–4 depict a first embodiment of a self-pumping hydropneumatic spring strut 40 configured in accordance with the present invention. As shown in FIG. 1, the inventive spring strut 40 comprises a work cylinder 2 which is divided by a work piston 6 having a circumferentially disposed piston seal 4 into a high-pressure work cavity 21 and a low-pressure work cavity 22. The work piston 6 is carried by a piston rod 10 having a pump cylinder 9 defined therein. A pump rod 1 having a generally conically shaped tip 42 that defines a regulating area 7 having a length Y (see, e.g. FIG. 3) extends into the work cylinder 2 and into the pump cylinder 9. A pin 28 is connected to the tip 42 of the pump rod 1.

An annular valve 24 having a valve body 26 is disposed on the pin 28 and is movable coaxial therealong. The valve body 26 includes a first end face 32 and an oppositely disposed second end face 34. A coil spring 27 is disposed coaxially on the pin 28 and contacts the second end face 34 so as to bias the first end face 32 of the valve body 26 into abutting engagement with a valve seat 38 defined in the pump cylinder 9 and with a shoulder 36 defined between the conical tip 42 and the pin 28. A constant passage 25 defined through the valve body 26 extends between the first and second end faces 32, 34 and fluidly connects the pump cylinder 9 with a regulating cavity 47 defined in the work piston 6. Depending on the position of the work piston 6 in the work cylinder 2, the regulating cavity 47 may be fluidly connected with the high-pressure work cavity 21, as described in more detail hereinbelow.

The pump cylinder 9, valve 24 and spring 27 comprise a piston pump 70 that pumps oil within the inventive spring strut 40 as the strut 40 compresses and elongates.

A first one-way or nonreturn valve 14 is included in the work piston 6 near the valve seat 38 and permits one-way fluid flow from the low-pressure work cavity 22 into the pump cylinder 9. A second one-way or nonreturn valve 5 is included in the work piston 6 near the regulating cavity 47 and permits one-way liquid flow from the regulating cavity 47 into the high-pressure work cavity 21.

The high-pressure work cavity 21 is fluidly connected with a high-pressure reservoir 50 that is partly filled with a gas and partly filled with a dampening medium such, for example, as oil. The reservoir 50 is partitioned by a dividing piston 3 into a first high-pressure cavity 12 containing the gas and a second high-pressure cavity 11 containing the oil. Alternatively, a resilient diaphragm may separate the cavities 11, 12 in the reservoir 50. The high-pressure reservoir 50 is fluidly connected to the high-pressure work cavity 21 via a flow connection 30 including a damping valve 23.

The low-pressure work cavity 22 is fluidly connected with a low-pressure reservoir 60 having a first low-pressure cavity 16 filled with a gas and a second low-pressure cavity 17 filled with a damping medium such, for example, as oil. The reservoir 60 is fluidly connected through a regulating openings 8, 19 to the low-pressure work cavity 22.

The high- and low-pressure work cavities 21, 22 and the high- and low-pressure reservoirs 50, 60 cooperatively pressurize the work cylinder 2 as the piston rod 10 is caused to move in and out of the work cylinder 2, as described in more detail hereinbelow.

The valve 24 is arranged on the pin 28 so as to be movable axially therealong and is held in a predetermined end position depicted in FIG. 1 by the spring 27. As the work piston 6 is caused to move out of the work cylinder 2, the valve 24 is caused to move axially along the pin 28, compressing the spring 27, and the first nonreturn valve 14 remains blocked. Alternatively, when the work piston 6 is caused to move into the work cylinder 2, movement of the valve 24 is arrested by the shoulder 36 such that the valve 24 remains in the position shown in FIG. 1 and the first nonreturn valve 14 is unblocked during a further axial movement of the work piston 6 in this direction, i.e. into the work cylinder 2 and towards the high-pressure work cavity 21. In addition, as the piston 6 is caused to move into the work cylinder 2 and past the regulating area 7, the channel 62 is fluidly closed due to a sealing engagement between the pump rod 1 and the work piston 6.

If the work piston 6 is moved further out of the work cylinder 2, e.g., when the vehicle is unloaded, a short circuit is created between the low-pressure reservoir 60 and the high-pressure reservoir 50 (see, e.g. FIG. 4), when the regulating opening 8 is unblocked, so that the vehicle body is lowered again to the predetermined level.

With every stroke of the work piston 6 in the work cylinder 2, a damping medium is delivered from the second low-pressure cavity 17 via the opening 19 into the low-pressure work cavity 22 and then, via the first nonreturn valve 14, into the pump cylinder 9—provided that the valve 24 is not seated in the valve seat 38 and blocking the first nonreturn valve 14. As a result of the pumping movement of the pump rod 1 in the pump cylinder 9 during each stroke of the work piston 6, the damping medium is conveyed from the pump cylinder 9 through the constant passage 25 into the high-pressure work cavity 21 via either the second nonreturn valve 5, for compression strokes, or via the bypass or channel 62 (see FIG. 4), for expansion or elongation strokes. Consequently, the high-pressure gas cavity 12 is simultaneously pretensioned via the opening 18. During elongation strokes, the work piston 6 moves out of the work cylinder 2 as the level of the vehicle body rises relative to the vehicle wheels until the piston 6 passes the conical tip 42 of the pump rod 1, i.e. until the piston 6 is positioned near the regulating area 7 (see, e.g. FIG. 3). Due to the generally conical shape of the regulating area 7 defined by the conical tip 42, a bypass or channel 62 (see, e.g. FIG. 4) is created between the high-pressure work cavity 21 and the pump cylinder 9 which permits the flow of fluid therebetween and which reduces or entirely eliminates the output of the piston pump 70. The bypass 62 necessarily extends through the constant passage 25 of the valve 24—the constant passage 25 being required in this embodiment due to the presence of the pin 28 which causes displacement of the fluid in the pump cylinder 9 as the piton rod 10 moves with the work cylinder 2.

Figure 2:
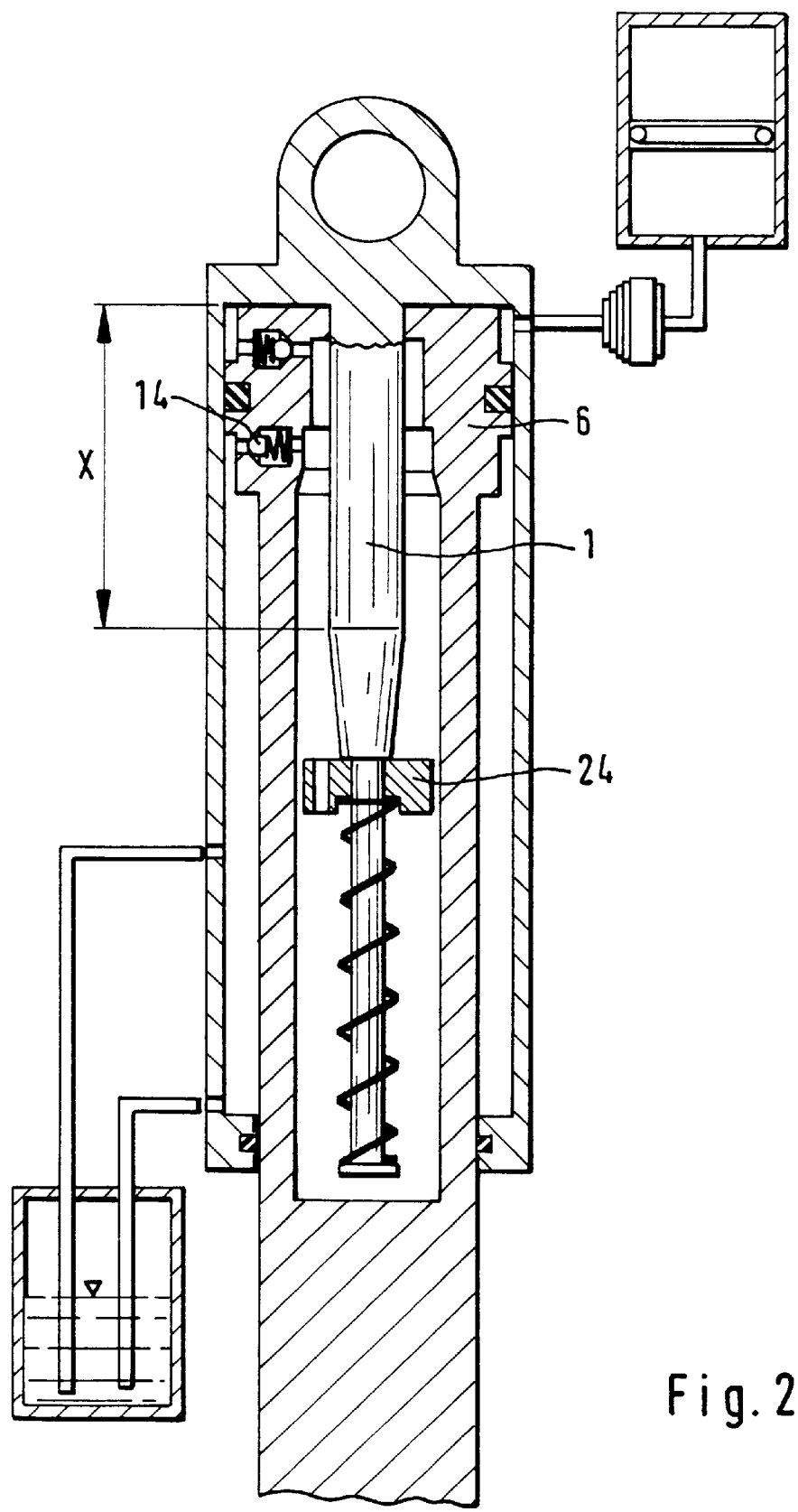
FIG. 2 is a view of the spring strut of FIG. 1 compressed and the piston rod disposed completely in the work cylinder.
Figure 3:
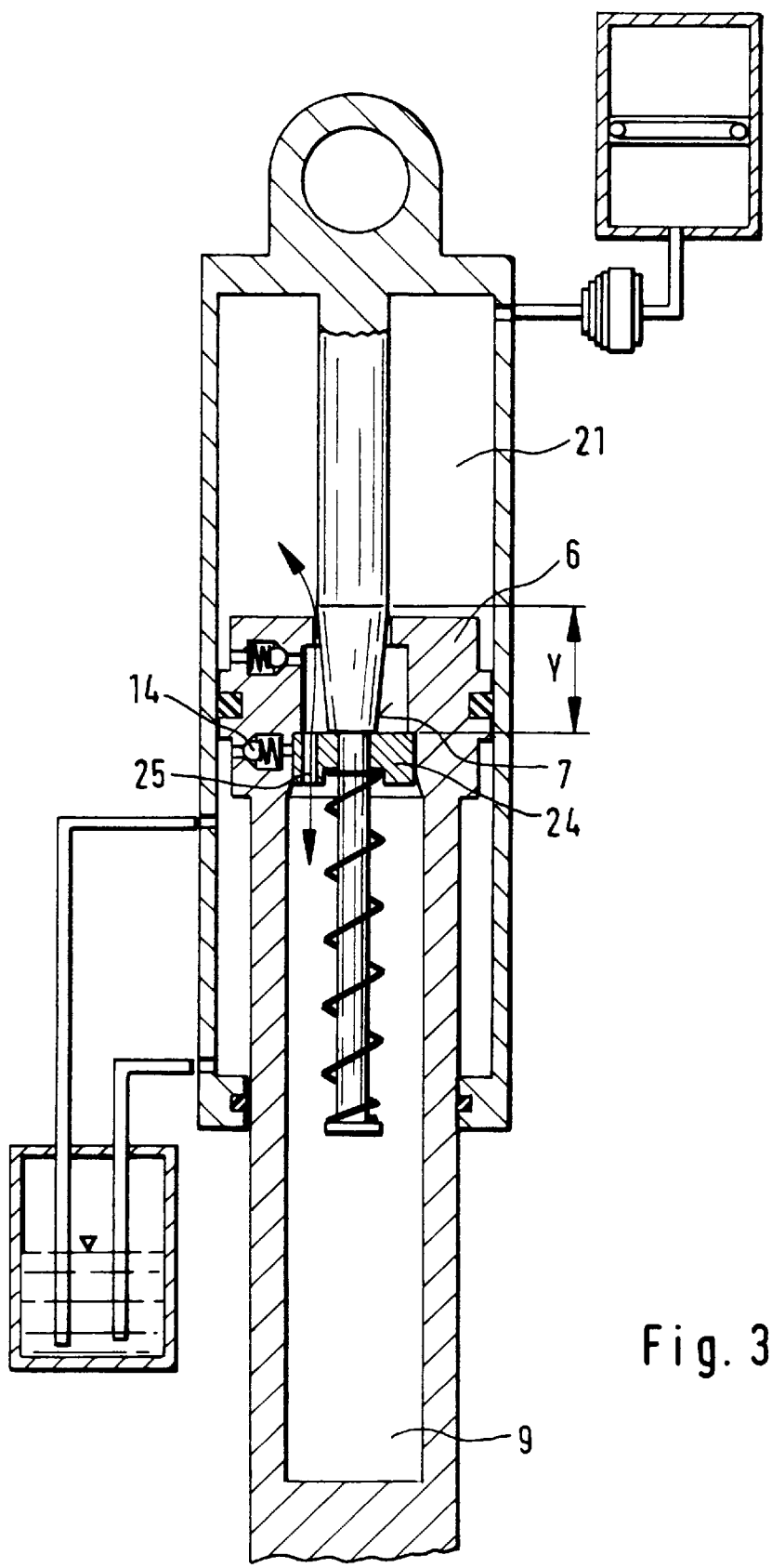
FIG. 3 is a view of the spring strut of FIG. 1 in a static position and the work piston disposed about the regulating area of the pump rod.
Figure 4:
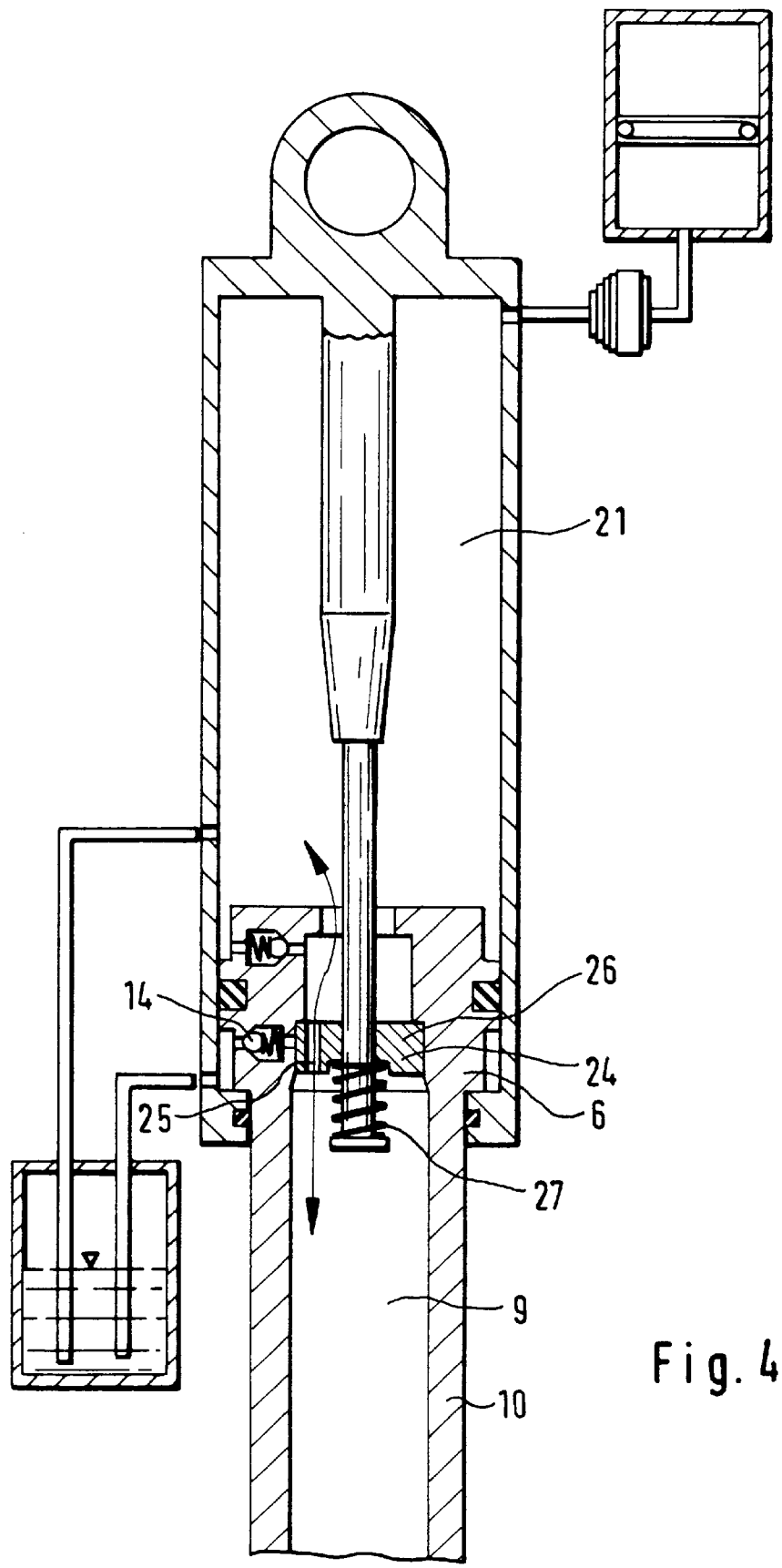
FIG. 4 is a view of the spring strut of FIG. 1 elongated and the piston rod disposed completely out of the work cylinder.
Figure 5:
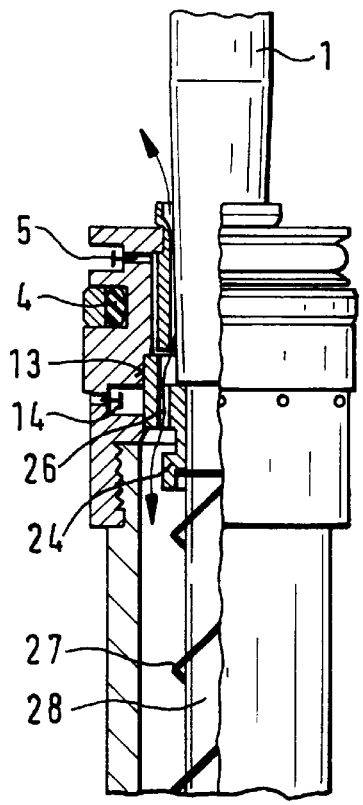
FIG. 5 is a partial cross-sectional detailed view of an embodiment of a work piston of a spring strut configured in accordance with the present invention.
Figure 6:
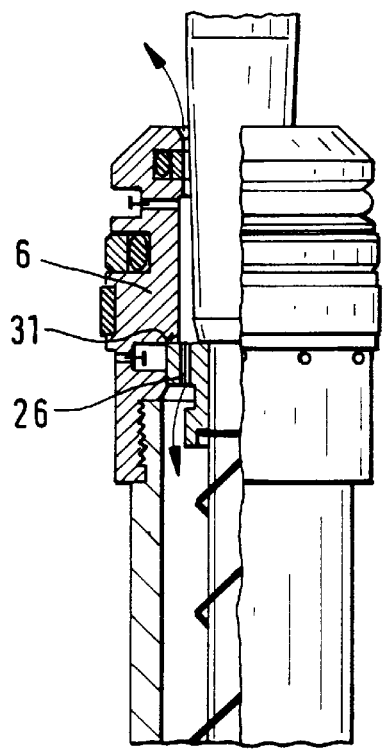
FIG. 6 is a partial cross-sectional detailed view of an alternative embodiment of a work piston of a spring strut configured in accordance with the present invention.

Referring next to FIGS. 2–4, the inventive spring strut 40 is there depicted: 1) in a compressed condition (FIG. 2), e.g. such as when the vehicle experiences a maximum load condition; 2) with the piston 6 located approximately at the regulating area 7 (FIG. 3); and 3); in an elongated condition (FIG. 4). Thus, FIGS. 2–4 depict three predetermined positions of the work piston 6.

FIG. 2 depicts the inventive spring strut 40 at its shortest length. The work piston 6 moves along the pump rod 1 in a sealing manner (i.e. no fluid communication between the pump cylinder 9 and the high-pressure work cavity 21) and the area indicated by reference letter X defines a generally cylindrical area in which the greatest pump output is generated. When the work piston 6 is disposed as in FIG. 2, the valve 24 does not block the first nonreturn valve 14 and fluid communication is possible between the low- and high-pressure work cavities 22, 21 via the first and second nonreturn valves 14, 5 and the pump cylinder 9.

FIG. 3 shows a position of the work piston 6 in which the work piston 6 is located approximately at the regulating area 7 of the pump rod 1—the regulating area extending along a length Y. When the work piston 6 is disposed thusly, a fluid connection is formed between the high-pressure work cavity 21 and the pump cylinder 9, via the constant passage 25 and the bypass 62. The first nonreturn valve 14 remains blocked by the valve 24 and fluid communication between the low-pressure work cavity 22 and the pump cylinder 9 is prevented.

FIG. 4 shows the embodiment form in which the piston rod 10 is moved farther out of the work cylinder 2. The valve 24 still blocks the nonreturn valve 14 while the spring 27 holds the valve 24 in contact with the valve seat 38 of the work piston 6 by corresponding reservoir 50 and the low-pressure reservoir 60 are peripherally defined about the work cylinder 2 and are separated from each other by an intermediate wall 15.

Figure 7:
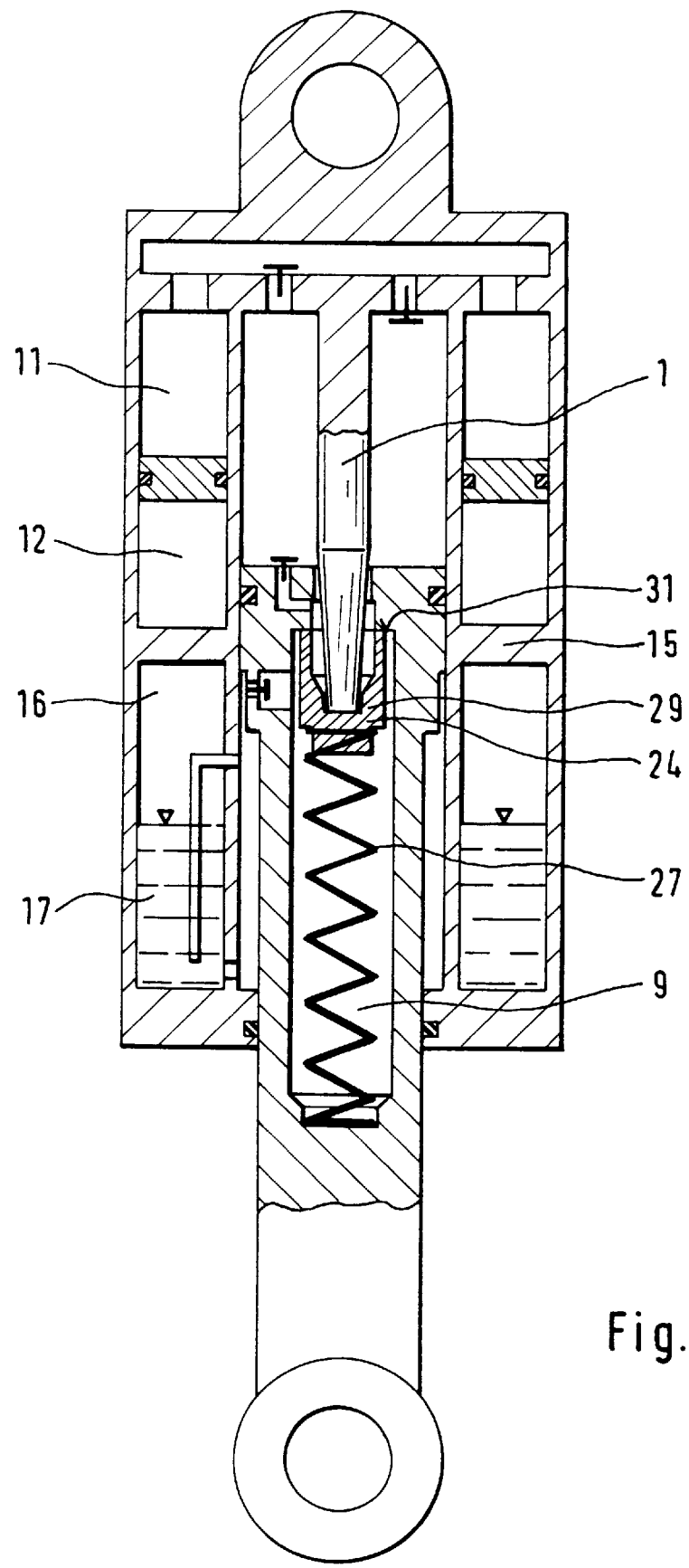
FIG. 7 is a cross-sectional view of an alternative embodiment of a spring strut configured in accordance with the present invention.

While the valve 24 configure as a cup-shaped component part 29 has been described herein with respect to the embodiment depicted in FIG. 7, it will be obvious to persons skilled in the art that such description applies equally to the various embodiments depicted in FIGS. 1–6.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A vehicular self-pumping hydropneumatic spring strut having internal level regulation for controlling the height of a vehicle body, said spring strut comprising:

a work cylinder filled with oil and divided into a high-pressure work cavity and a low-pressure work cavity by a work piston carried by a hollow piston rod movable into and out of said work cylinder, said work cylinder being pressurized by a gas communicated to said high-pressure work cavity;

a piston pump having a pump cylinder formed by said hollow piston rod and being configured for communicating oil between said a low-pressure work cavity and said high-pressure work cavity;

a pump rod fastened to said work cylinder and configured to penetrate into said pump cylinder as said piston rod moves into and out of said work cylinder, said pump rod having a generally conically shaped tip having a length that defines a regulating area of said spring strut, said high-pressure work cavity and said pump cylinder being fluidly connected when said work piston is positioned approximately at said regulating area, said regulating area being fluidly closable by a sealing engagement created between said pump rod and said work piston as said piston rod is moved into said work cylinder and past said regulating area;

a first nonreturn valve located in said work piston and configured to fluidly connect said pump cylinder with said low-pressure work cavity;

a second nonreturn valve located in said work piston and configured to fluidly connect said pump cylinder with said high-pressure work cavity; and a valve located between said high-pressure work cavity and said pump cylinder and configured to block said first nonreturn valve so as to fluidly disconnected said low-pressure work cavity and said pump cylinder when said piston rod is moved out of said work cylinder, said valve unblocking said first nonreturn valve so as to fluidly connect said low-pressure work cavity and said pump cylinder when said piston rod is moved into said work cylinder.

2. The spring strut of claim 1, wherein said valve is constructed as an annular disk disposed within said pump cylinder for movement axial therewith.

3. The spring strut of claim 1, wherein said work piston further comprises a valve seat defined thereon and wherein said valve further comprises a valve face configured for contacting engagement with said valve seat.

4. The spring strut of claim 1, wherein said valve further comprises a valve body and wherein said spring strut further comprises a spring located between said valve body and said pump rod so as to exert a spring force therebetween.

5. The spring strut of claim 4, wherein said valve body comprises a first end face which contactingly engages a valve seat defined on said work piston and a shoulder defined on said pump rod, said valve body further comprising a second end face located opposite said first end face and upon which said spring acts.

6. The spring strut of claim 2, wherein said pump rod further comprises a cylindrical pin attached to said conical tip and extending axially therefrom, said annular disk being disposed on said cylindrical pin for axial movement thereon.

7. The spring strut of claim 4, wherein said valve body is substantially cup-shaped and comprises an annular end face configured to cooperatively engage said valve seat, said valve body further including an interior end face configured for contacting engagement with said tip of said pump rod.

8. The spring strut of claim 1, wherein said work cylinder is pressurized by a gas communicated to said high-pressure work cavity from a high-pressure reservoir connected to said high-pressure work cavity via a flow connection.

9. The spring strut of claim 8, further comprising a damping valve located in said flow connection.

* * * * *